(12) United States Patent
Narjala

(10) Patent No.: US 8,464,322 B2
(45) Date of Patent: Jun. 11, 2013

(54) SECURE DEVICE INTRODUCTION WITH CAPABILITIES ASSESSMENT

(75) Inventor: Ranjit S. Narjala, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/337,666

(22) Filed: Dec. 27, 2011

(65) Prior Publication Data

US 2012/0096141 A1 Apr. 19, 2012

Related U.S. Application Data

(62) Division of application No. 11/514,452, filed on Sep. 1, 2006.

(51) Int. Cl.
*G06F 15/16* (2006.01)
*H04L 29/06* (2006.01)
*G06F 7/04* (2006.01)

(52) U.S. Cl.
USPC ............................. 726/4; 709/223; 709/226

(58) Field of Classification Search
USPC ...................................... 726/4; 709/223, 226
See application file for complete search history.

(56) References Cited

U.S. PATENT DOCUMENTS

| | | | |
|---|---|---|---|
| 5,621,729 A | 4/1997 | Johnson et al. | |
| 5,822,523 A * | 10/1998 | Rothschild et al. | 709/236 |
| 6,011,782 A | 1/2000 | DeSimone et al. | |
| 7,370,350 B1 | 5/2008 | Salowey | |
| 7,788,707 B1 | 8/2010 | Zhou | |
| 7,827,545 B2 | 11/2010 | Choe et al. | |
| 7,881,235 B1 * | 2/2011 | Arthur et al. | 370/261 |
| 2002/0059434 A1 | 5/2002 | Karaoguz et al. | |
| 2003/0055994 A1 | 3/2003 | Herrmann et al. | |
| 2003/0088651 A1 * | 5/2003 | Wilson, Jr. | 709/221 |
| 2003/0095510 A1 | 5/2003 | Dorenbsoch | |
| 2004/0263530 A1 | 12/2004 | Sahuc et al. | |
| 2005/0060411 A1 | 3/2005 | Coulombe et al. | |
| 2005/0086346 A1 | 4/2005 | Meyer | |
| 2005/0094581 A1 * | 5/2005 | Giloi et al. | 370/260 |
| 2005/0147044 A1 | 7/2005 | Teodosiu et al. | |
| 2005/0232247 A1 | 10/2005 | Whitley et al. | |
| 2005/0237377 A1 * | 10/2005 | Chapweske et al. | 348/14.08 |

(Continued)

FOREIGN PATENT DOCUMENTS

| | | |
|---|---|---|
| CN | 914474 B | 2/2012 |
| EP | 1113659 A2 | 7/2001 |
| EP | 1335563 A2 | 8/2003 |

OTHER PUBLICATIONS

Phan, Thomas et al. "An Extensible and Scalable Content Adaptation Pipeline Architecture to Support Heterogeneous Clients", 2002.*

(Continued)

*Primary Examiner* — Michael Simitoski
(74) *Attorney, Agent, or Firm* — Schwabe, Williamson & Wyatt, P.C.

(57) ABSTRACT

Introducing, managing and restricting devices in an environment is discussed, including how to securely introduce the devices, how to establish trust between the devices, how to manage bandwidth requirements and other resource requirements of the devices, how to aggregate resource usage when multiple devices within an environment are engaging in a common task, and how to restrict device access to environment resources. Various techniques including manual and automatic solutions are disclosed.

19 Claims, 8 Drawing Sheets

U.S. PATENT DOCUMENTS

| | | | |
|---|---|---|---|
| 2005/0257055 A1 | 11/2005 | Anderson | |
| 2006/0053276 A1 | 3/2006 | Lortz et al. | |
| 2006/0056636 A1 | 3/2006 | Schrum | |
| 2006/0101280 A1 | 5/2006 | Sakai | |
| 2006/0161538 A1 | 7/2006 | Kiilerich | |
| 2006/0183462 A1 | 8/2006 | Kolehmainen | |
| 2006/0239217 A1 | 10/2006 | Hassan et al. | |
| 2006/0245379 A1* | 11/2006 | Abuan et al. | 370/261 |
| 2007/0005766 A1 | 1/2007 | Singhal | |
| 2007/0015463 A1 | 1/2007 | Abel | |
| 2007/0022185 A1* | 1/2007 | Hamilton et al. | 709/220 |
| 2007/0055752 A1 | 3/2007 | Wiegand et al. | |
| 2007/0094366 A1 | 4/2007 | Ayoub | |
| 2007/0192600 A1 | 8/2007 | Wong | |
| 2007/0288743 A1 | 12/2007 | Cam-Winget et al. | |

OTHER PUBLICATIONS

Lin, Chia-Wen et al., "Dynamic Region of Interest Transcoding for Multipoint Video Conferencing," IEEE Transactions on Circuits and Systems for Video Technology 13(10):982-992, Oct. 2003.

Thiruvathukal, George K., "Home Networking," IEEE Computing in Science & Engineering, 8(1):84-91, Jan.-Feb. 2006.

Office Action, issued in CN 200780028449.7, mailed Mar. 24, 2011, 5 pages.

Notice of Granting Patent, issued in CN 200780028449.7, mailed Oct. 25, 2011, 4 pages.

International Search Report & Written Opinion, issued in PCT/US2007/076633, mailed Jan. 8, 2009, 8 pages.

International Preliminary Report on Patentability, issued in PCT/US2007/076633, mailed Mar. 12, 2009, 6 pages.

Restriction Requirement, issued in U.S. Appl. No. 11/514,452, mailed Oct. 18, 2010, 5 pages.

Office Action, issued in U.S. Appl. No. 11/514,452, mailed Dec. 17, 2010, 13 pages.

Final Office Action, issued in U.S. Appl. No. 11/514,452, mailed Apr. 29, 2011, 12 pages.

Office Action, issued in U.S. Appl. No. 11/514,452, mailed Sep. 7, 2011, 12 pages.

Final Office Action, issued in U.S. Appl. No. 11/514,452, mailed Feb. 16, 2012, 12 pages.

Extended European Search Report for EP Application No. 07873783.0 dated Jun. 27, 2012, 9 pages.

* cited by examiner

SECURE DEVICE INTRODUCTION WITH CAPABILITIES ASSESSMENT

RELATED APPLICATION

The application is a division of U.S. patent application Ser. No. 11/514,452, filed Sep. 1, 2006, entitled "SECURE DEVICE INTRODUCTION WITH CAPABILITIES ASSESSMENT," and claims priority to the 11/514,452 application.

FIELD OF THE INVENTION

The invention generally relates to securely introducing devices into an environment, and more particularly to establishing relationships between, managing data communication with, and restricting resource access of devices introduced into an environment.

BACKGROUND

Wired and wireless communication between computing devices has enjoyed wide adoption and significant growth as a flexible and cost-effective infrastructure has become available. For example, gigabit Ethernet and wireless technology such as WiFi (a common name for several related standards proposed by the Institute of Electrical and Electronics Engineers, "IEEE"), Bluetooth, infrared coded data, etc. permit data transfer via wireless signals or fast wired data pathways. Unfortunately, while new standards and improved equipment have increased network data rates, the technology continues to have issues that have not been satisfactorily addressed, such as easily and securely introducing devices, and once introduced, configuring devices and establishing trust (as needed) between the devices.

In addition to configuration difficulty for devices introduced into an environment, another problem is bandwidth management or allocation, which may be an issue when, as often happens, multiple devices in an environment are engaging in a common task with devices outside the environment. An example would be multiple devices engaging in a data download, peer-to-peer data transfer, conferencing or telephony communication session, etc. Another issue is establishing trust and identity between various devices, such as conference participants. Yet another issue is determining a proper scope of rights in the environment for visiting devices.

BRIEF DESCRIPTION OF THE DRAWINGS

The features and advantages of the present invention will become apparent from the following detailed description of the present invention in which.

DETAILED DESCRIPTION

It will be appreciated there are several different issues being addressed herein, one of which being how to securely introduce devices into an environment, such as a digital home, digital office, etc. discussed above, where some or all of the devices may be operating over wireless communication channels. Another issue is how to establish trust between the devices, such as to enable devices to set up trusted multiparty, multi-media conferences and sharing of media between devices over a secure communication channel, and enable devices to be confident of the authenticity of other endpoints in the conference. It will be appreciated endpoints establishing trust relationships with a common device may indirectly establish trust with other endpoints based at least in part on knowledge the other endpoints have similarly established trust relationships with the common device. Another issue is minimizing bandwidth requirements when multiple devices within an environment may be engaging in a common task and hence it may be beneficial to aggregate communication into a common communication in to or out of the environment. Another issue smart bandwidth allocation so low bandwidth devices are recognized as such and are not unnecessarily provided bandwidth to the detriment of other high-bandwidth devices. Other issues are addressed herein as well and will become apparent from the following description.

When introducing devices in an environment, such as a local area network (LAN) or wireless LAN (WLAN), and/or other communication environment, it will be appreciated devices may transfer credentials within the environment, and while doing so, a device may also communicate it capabilities and resource requirements to facilitate configuring the device for use within the environment. Credentials may be passwords or encryption keys required to obtain access to network resources, or other configuration information useful or necessary to operate the device. Capabilities and requirements provided by the device (and/or determined based on device identity) may be used to facilitate coordinating efficient communication between devices within an environment with devices outside the environment, such as aggregating overlapping communication sessions into a single common session between the environment and external communication end points, as well as to facilitate smart bandwidth allocation through transcoding data sent to a device, as well as segregating some devices to limit their access (as desired) to resources of the environment, etc.

Figure 1:
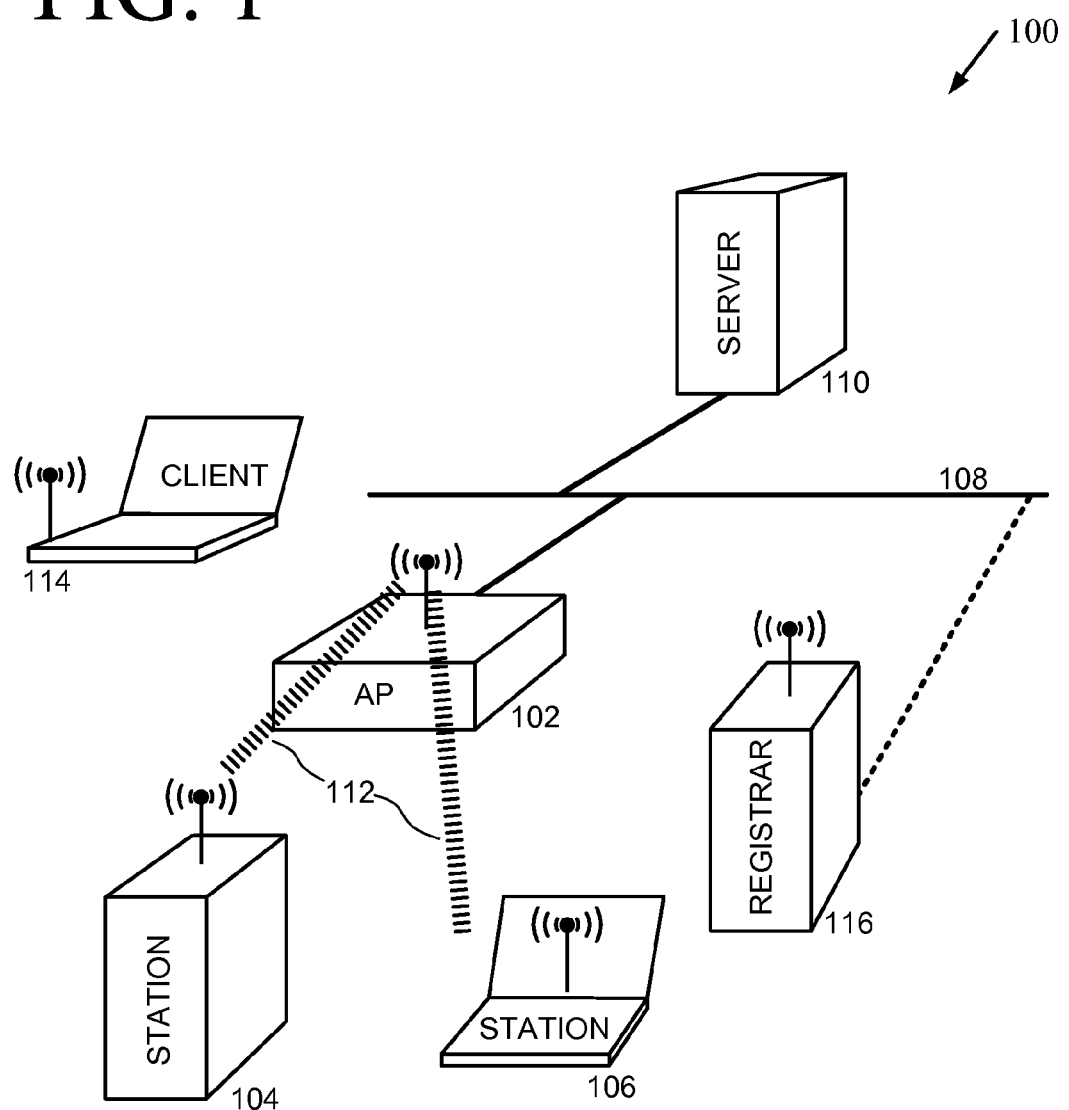
FIG. 1 shows an exemplary network environment according to an embodiment of the invention.

FIG. 1 illustrates an environment 100 including an Access point ("AP") 102 that is a central element in many WLANs since may communicate with one or more stations 104, 106 that use the wireless network, and may copy data packets to or from a traditional wired network 108 so that stations 104 and 106 can communicate with devices such as server 110 that lack a wireless interface. If WEP (Wired Equivalent Privacy), WPA (Wi-Fi Protected Access), IEEE 802.11i, or other security is in effect, devices such as stations 104 and 106 share an encryption key with AP 102. In this figure, WEP/WPA protected connections are indicated with thick dashed lines 112. It will be appreciated devices of the environment 100 may be engaging in any sort of network activity, such as client devices accessing network data on the Internet, an intranet, etc., streaming video feeds, participating in video and/or data conferences, downloading, etc.

If the user of a device such as laptop WLAN client 114 wishes to use the wireless network through AP 102 to access resources on other wireless or wired nodes, it must obtain a valid encryption key and enter it into the wireless device's configuration. Traditionally, an administrator of the wireless network would provide the key and the user would type it into a configuration form. However, this approach is inconvenient for the user and cumbersome for the administrator. In addition, an unauthorized user may obtain a copy of the key from the user and use it to access the network. Changing the WLAN configuration to exclude such an unauthorized user may entail re-configuring all of the other authorized devices.

An alternate method of managing WLAN access may use a registration protocol according to an embodiment of the invention. For example, a protocol may be used allowing WLAN client 114 to register with a network entity called a Registrar 116 by way of communication through AP 102. While illustrated as separate entities, in another embodiment, the Registrar may be integrated with the AP, and yet other embodiments may use several Registrars. In some embodiments, there may also be a Media Gateway Device (MGD), which may be a standalone device or, as assumed in the illustrated embodiment, incorporated within the Registrar. The MGD may configured to perform various tasks, such as coordinating communication for multiple devices within the environment be engaging in a common communication task, such as a video conference, with devices outside the environment, such as with devices on the Internet, or transcoding content to provide compatibility or reducing bandwidth, or to block out attempts by a device to access communication features not authorized for the device within the environment.

In some embodiments, device introduction into a new environment may utilize a relatively secure Out-Of-Band (OOB) channel to initially transfer data from an existing device, such as a Registrar or other device in the environment to a new device being introduced. This data may, for example, be used to at least temporarily establish a secure communication channel over which the new device may subsequently be configured. An Application Framework implementing the registration protocol may be used to provide a common framework for new device configuration. In one embodiment, application software for a device registers with the Application Framework, and the framework coordinates with the Registrar (or other existing device) and the new device to automatically configure the new device when it is introduced. Registrar 116 may communicate with AP 102 over the wired network 108, over a wireless (radio) connection, or both. The Registrar may provide administrative facilities to monitor the WLAN and manage encryption keys.

In the illustrated embodiment, a New WLAN client 114 has an associated secret called a device password which can be used as the OOB data to transfer for establishing the secure communication channel. The password may be engraved on the device or printed on a label, or may be displayed by the device or by software associated with the device. If the device password is displayed in this way, it may be dynamic (for example, the displayed password may be valid for a period of time or until some event occurs, then a new device password may be chosen and displayed). In some embodiments, the device password may be readable by a reader device near the new client. For example, Near Field Communication ("NFC") devices can exchange data wirelessly over a short distance, so a device password might be stored in an NFC token and read by an NFC reader. In another embodiment, the new WLAN client might be equipped with an infrared or other light signal transmitter, and be able to transmit the device password to an optical receiver of the Registrar within line-of-sight proximity. These and other known techniques may be used to perform an OOB data transfer between the new device and the existing device in the environment, e.g., the Registrar, to facilitate establishing the secure communication channel.

As noted above, it is presumed that an in-band communication channel can be (or already is) compromised. A typical example of a high-risk in-band channel is a public wireless "hotspot," e.g., a place providing public network access, or a hotel room network connection. To avoid the new device being compromised when it is introduced, in various embodiments, an initial OOB data transfer with the new device is performed to bootstrap establishing a secure communication channel over which to then configure the new device. For example, assuming the OOB data contains cryptosystem data, the new device and Registrar, or other existing device, proxy, etc., use the cryptosystem data to establish a secure communication channel with the new device. It will be appreciated various cryptographic protocols and techniques may be used; in some embodiments, the new device may request a Registrar, Framework Protocol Stack (see, e.g., the FIG. 4 embodiment) or other entity or programmatic construct to act as a certificate authority (CA) for cryptographic, e.g., X.509, type certificates.

Figure 2:
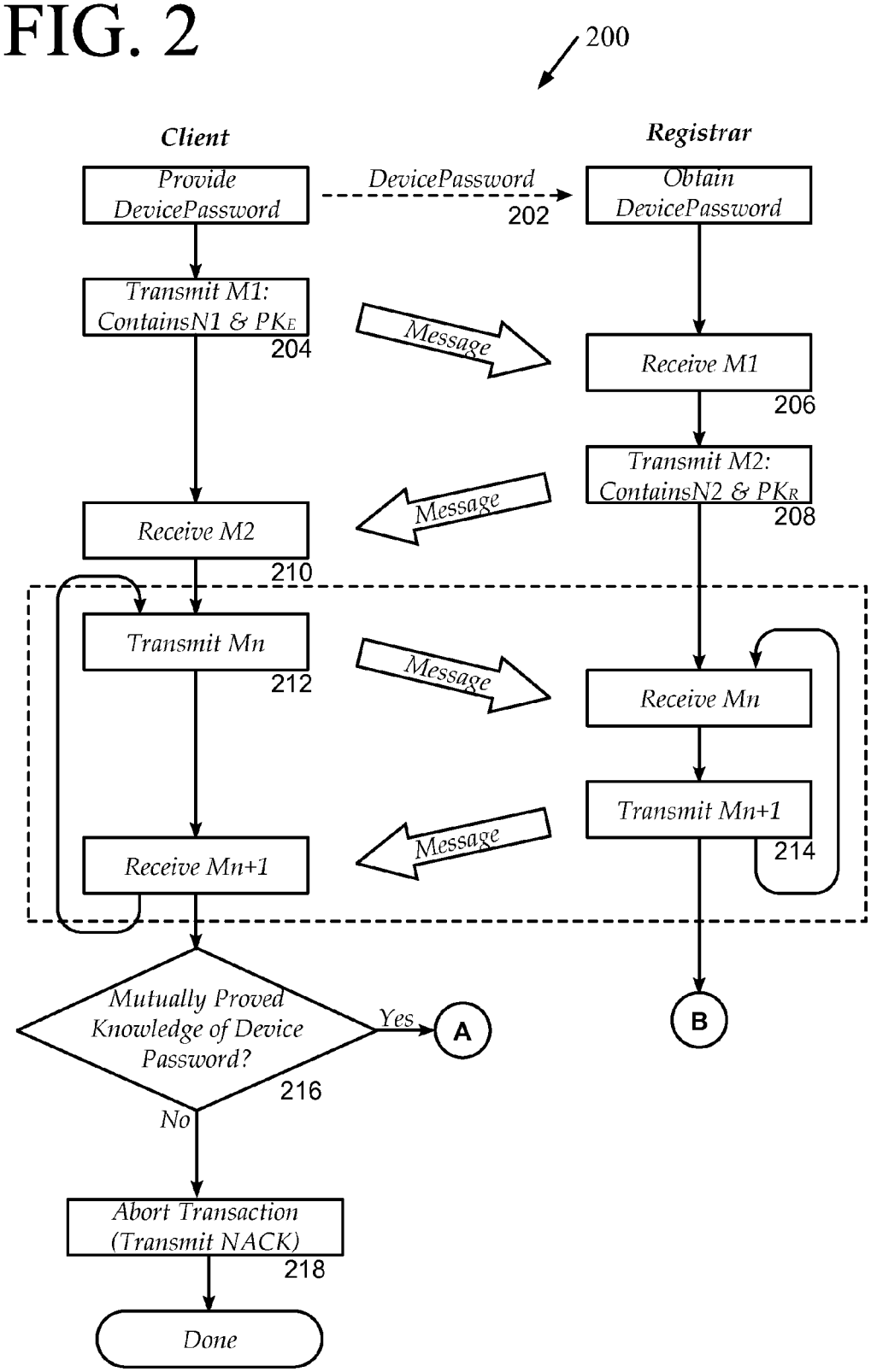
FIG. 2 is a flow chart of an exemplary protocol transaction according to an embodiment of the invention.
Figure 2:
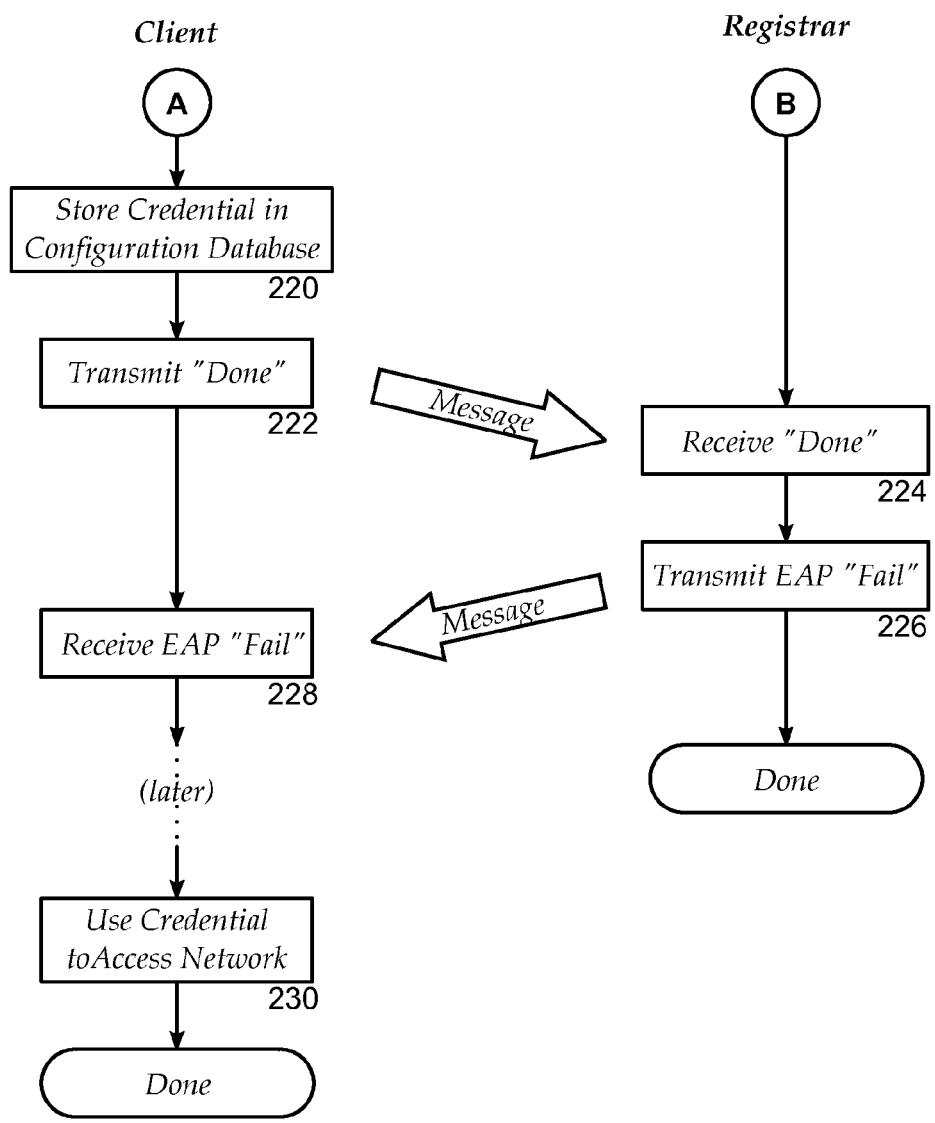

FIG. 2 illustrates a flow chart 200 according to one embodiment to securely transfer a credential such as a WEP key from the Registrar to the client. Registrar 116, AP 102 and client 114 can interact according to FIG. 2. All messages can be sent in-band (for example, over the wireless communication channel), or some messages can be sent over a different channel. The embodiment described with reference to this figure uses the Extensible Authentication Protocol ("EAP"), as described in the Internet Engineering Task Force ("IETF") Request for Comments ("RFC") number 3748 dated June 2004, as a framework for transmitting and receiving many of the messages in the protocol. However, it will be appreciated messages according to embodiments of the invention can be used with other communication frameworks, or transmitted as raw data over any sort of communication channel. Further it will be appreciated that the following FIG. 2 discussion is of a high level and for clarity in presentation some encryption details have been left out.

First, the client's device password is provided to the Registrar 202. This may be accomplished by reading the password from the client's label or display and entering it through a Registrar user interface, by placing the client near the Registrar so that the Registrar can read the client's NFC token automatically, or via some other OOB method. Next, after initiating the EAP transaction 204 (not illustrated), the client transmits a first message ("M1") (encapsulated within an EAP message) to initiate the introduction protocol with the Registrar. M1 contains a first random number N1 and a public key $PK_E$ of the client, and may contain other information (described below). M1 is received by the Registrar 206.

The Registrar responds to M1 by transmitting a second message ("M2") containing a second random number N2 and a public key $PK_R$ of the Registrar 208. The client receives M2 210. The transaction continues with the client transmitting a message Mn 212 and the Registrar responding with message Mn+1 214. Portions of each message may be encrypted with a key known to both the client and the Registrar, or with a public or private key of one of the parties. Messages may have appended a message authentication code ("HMAC"), containing a cryptographic hash of the previous message and a portion of the current message preceding the MAC, to permit the recipient to verify that the other party correctly received the previous message and that no third party is tampering with the messages in transit.

The key used to compute the HMAC in one or more of the messages from the Registrar is authenticated using a device password that should match the client's own device password. This permits the client to verify that it is receiving credentials from an authorized Registrar (and not, for example, from a rogue Registrar that is attempting to trick the client into connecting to a hostile wireless network). One or more of the messages from the Registrar contains a credential such as a WEP or WPA key that the client can use to access the wireless LAN through the AP. The credential may be encrypted with a key-encryption key to prevent its recovery by an eavesdropper. When the client receives the message containing the credential, it verifies the HMAC to ensure the message came from a Registrar with knowledge of its own device password 216, e.g., in one embodiment a test is performed to ensure mutually proved knowledge of the device password was received. If the passwords differ, the client aborts the EAP transaction by transmitting a negative acknowledge ("NACK") message 218. If the HMAC correctly verifies knowledge of the device password, the client may decrypt the credential and store it in a configuration database for future use 220.

Once the client has successfully received the credential, in an EAP context, the session is terminated. For example, this may be performed by transmitting a "Done" response to the Registrar 222, which receives the "Done" message 224 and responds with an EAP "Fail" message 226. The client subsequently receives the "Fail" message 228. Note that in this context, the failure message does not mean that the client must repeat the EAP transaction to obtain a credential. It merely indicates that the transaction was used to provision a credential rather than to grant the client immediate use of the wireless LAN. The client may use the credential it received later, when it attempts to access the network through the AP 230. For example, the client may update its configuration according to data in the credential, or may use the credential to complete a new authentication protocol transaction designed to provide network access.

After successfully establishing communication with an introduced device, as will be discussed further below, configuring communication parameters and communication configurations for the devices may also be performed. For example, by establishing trust between the devices and a registrar, credentials may be exchanged between the devices to facilitate establishing trust between the devices. Or, bandwidth requirements for devices may be configured to control device inter-communication as well as communication to locations external to the environment.

Figure 3:
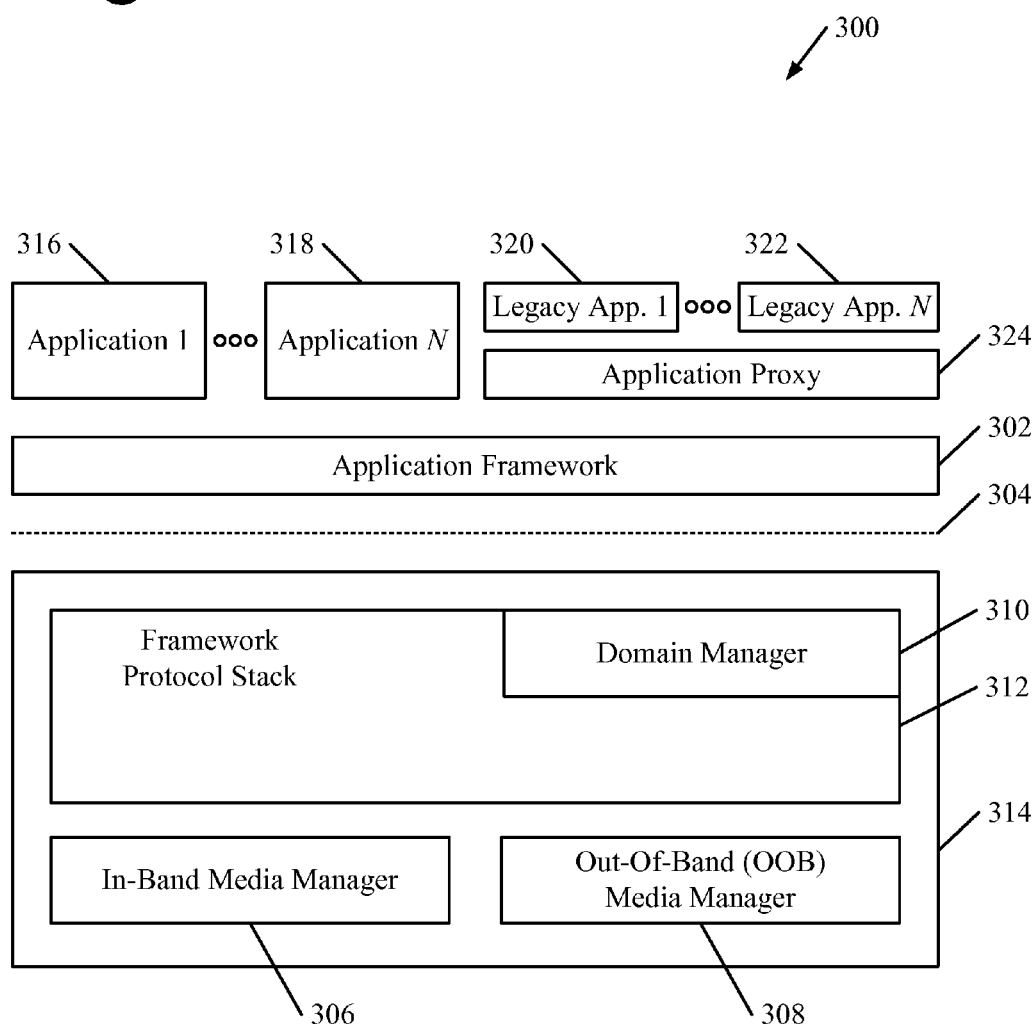
FIG. 3 illustrates, according to one embodiment, a framework for establishing initial trust relationships between devices and communicating these trust relationships.

FIG. 3 illustrates, according to one embodiment, a framework 300 for establishing initial trust relationships between devices and communicating these trust relationships, e.g., between various operating system, device driver, and application software components.

In one embodiment, an Application Framework 302 is built on device introduction mechanisms, such as those described above with respect to FIGS. 1-2. In one embodiment, the Application Framework is initialized after sending the Done message and before responding with the Fail message and terminating the EAP session. It will be appreciated by one skilled in the art the FIGS. 1-2 EAP discussion is exemplary and any message transport protocol may be used for credential setup. The illustrated Application Framework may be used by any application or device to bootstrap a secure communication channel. It will be further appreciated that device discovery techniques, such as wireless or wired network discovery data probes, Universal Plug and Play (UPnP) operations, or other discovery techniques may be used to announce a new device's presence in an environment, locate Registrars or other devices of the environment, and manage networked devices. An Application Programming Interface (API) or Software Development Kit (SDK) may also be defined to provide functions to perform the operations and techniques discussed herein for discovering, registering and configuring devices within an environment.

In the illustrated embodiment, the below line 304 components 306-312 may be standardized or become well-defined by a Specification, such as described in the "Wi-Fi Simple Config Proposal", the most current version at this time being Revision 1.0a dated Feb. 10, 2006. Below the line 304 components 306-312 include an In-Band media manager 306 for managing a conventional communication connections such as a Bluetooth link, an Institute of Electrical and Electronics Engineers (IEEE) 802.x type of WLAN link, etc. It is presumed this in-band communication channel is susceptible to attack.

There is also an Out-Of-Band (OOB) media manager 308 for managing OOB communication channels, such as the various exemplary communication channels discussed above. The OOB communication channel is presumed difficult to attack and hence is therefore deemed trustable for initial data exchanges to establish secure communication over the not-trusted in-band channel.

In one embodiment, a Registrar or other managing device may have associated policies that control what characteristics or features of a new device that may be allowed to become active. For example, while a new device may support instant messaging, the Registrar may be configured to ignore and/or not configure such features of software for a new device. This allows a user or other environment administrator to selectively allow resource access, e.g., to implement "guest" access. It will be appreciated restricting access may be based on automatically applied policies (or their equivalent) as well as through interaction with a user or other environment administrator. It will be appreciated various device characteristics, such as device type, owner, bandwidth or other resource requirements, well-behaved time in the environment, etc. may be used as decision factors in granting rights to a device. Thus for example, a telephony device may be brought into the environment and automatically only be granted access to resources compatible with the nature of the device, e.g., to conference data streams, audio portions of audiovisual data, etc.

In addition to an environment restricting a device's access, the device itself may impose its own access limitations, such as to protect itself from intrusion or to maximize its operation duration. For example, while an environment may support and/or allow certain activity, such access to streaming media, a particular device may nonetheless have its own local policy such that the device does not utilize the activity even though present and available in the environment. For example, security conscious device owners disallow activity even if offered in a particular environment, such as file sharing in a public access network hotspot. Or, if battery levels are low, a device may be configured to ignore battery intensive features available within an environment.

In one embodiment, each application that registers (or that has already registered), such as with the Application Framework 302 can be identified in an interface (not illustrated), such as a Graphical User Interface (GUI) for receiving user input, or to an automatic interface to process registrations, where the interface provides opportunity for a user or automatic registration processor to enforce a local policy or user interest in permitting, denying, or modifying an application's registration. For example, the "guest" access discussed above can be interactively enforced for a device introduced into an environment by, during introduction of the device, recognizing it is a foreign device and checking for applicability of rules, policies, or the like and prompting (if needed) a user by way of a GUI or other interface for access rights for this new device. Thus, a guest device of a visiting friend may be given restricted access in the environment, such as only being allowed to engage in certain types of communication, e.g., to grant or deny Internet access, to grant or deny music streaming, to time limit access to the environment, etc.

Figure 4:
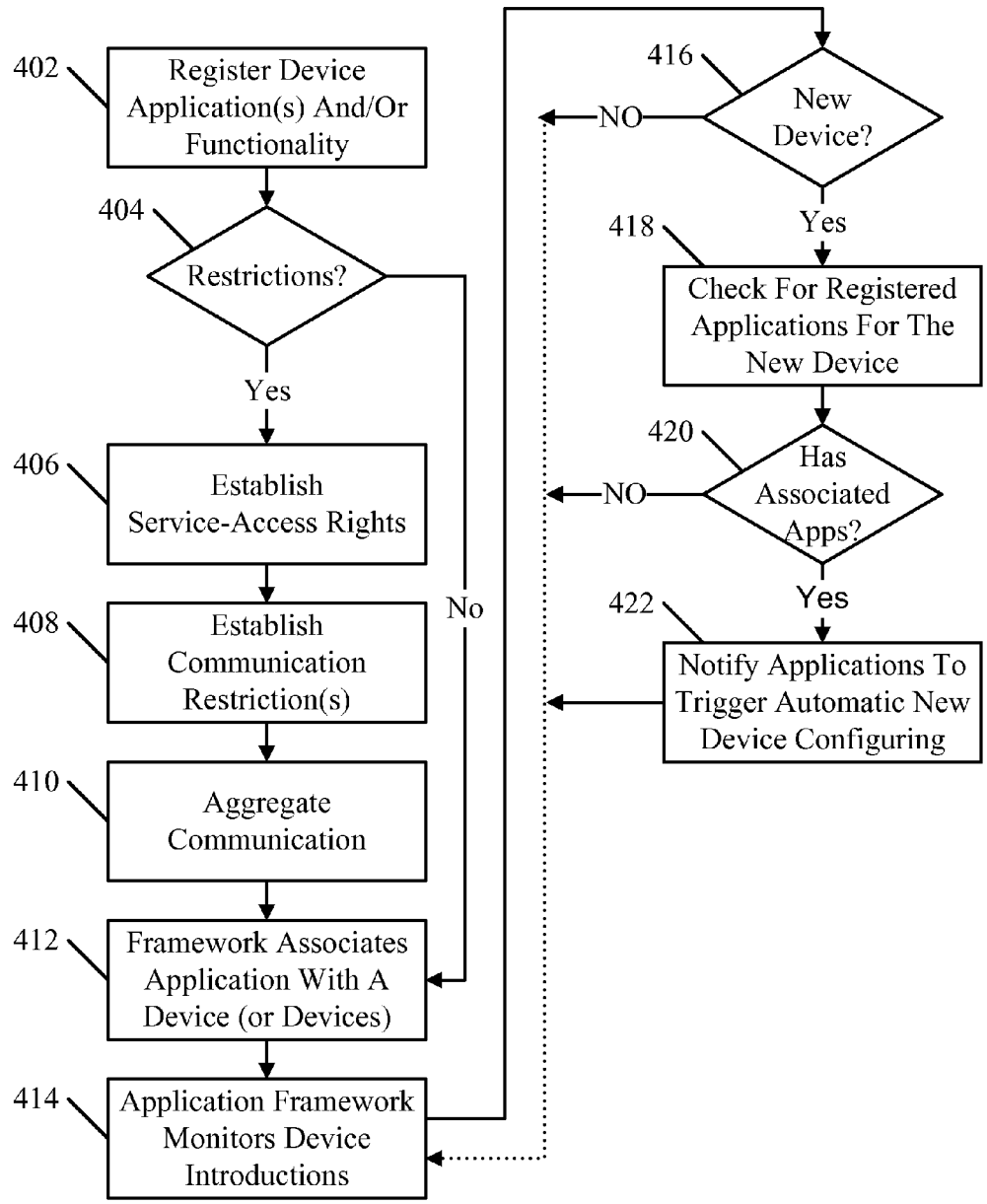
FIG. 4 illustrates a flowchart according to one embodiment for introducing devices into an environment.

FIG. 4 illustrates a flowchart 400 according to one embodiment for registering for and monitoring for device introductions to an environment. It will be appreciated a device may have multiple software and/or hardware applications or functionality that may be registered 402, such as with a FIG. 1 Registrar 116.

In the illustrated embodiment, a test is performed to check a newly added device to see if 404 restrictions are applicable to the device. It will be appreciated some devices, such as those previously registered with the system, or devices having a certain characteristic such as a digitally secured trust certificate or other trusted characteristic authenticated by a trusted party such as a CA (Certificate Authority) or other authority recognized by the environment may bypass the restriction checks. If 404 restrictions apply to the new device or functionality, service access restrictions and device configurations may be established 406-410. It will be appreciated while items 406-410 are illustrated sequentially, operations may occur in parallel or in a different order than as illustrated, and in some cases only selected operations are performed.

As discussed above and as will be discussed further with respect to FIG. 5 and FIG. 6, it may be desirable to establish 406 limited rights or guest access rights to an introduced device, such as to prevent local area network (LAN) file access, restrict access to bandwidth consuming services, etc. As discussed above, restrictions may be applied automatically and/or interactively through a GUI or other interface. For example, there may be situations where a user or environment administrator desires to allow only temporary device access to a network, such as when a visitor comes with a device, such as a Personal Digital Assistant (PDA), music player, camera, etc., and wants the visiting device to connect to the internet, share files with the user, play songs from the music player on a wireless or wired local area network (LAN) capable stereo system, share pictures from a camera, print pictures on a printer in the environment, etc.

In order for the visitor to perform these tasks, the user and/or administrator needs to grant necessary credentials to the visitor's device for it to perform desired tasks within the environment, e.g., to allow it network access and/or access to devices within the host environment. However, as will be appreciated, users or environment administrators do not want to give the visiting device unrestricted environment access but instead wants to carefully control the extent of network access the visitor's device receives. As discussed above with respect to FIG. 3 guest access or other device restrictions may be determined when introducing a device to an environment.

In one embodiment, restrictions are enforced with dynamic filters implemented on an Access Point (AP), router, gateway or other such device through which network access is obtained. In one embodiment environment devices and resources are accessible through their own physical and/or logical network reachable through an AP, router, gateway, etc. When registering a guest device in this embodiment, the user or environment administrator has the option of enforcing access restrictions on the new device. It will be appreciated defaults may be assigned for common interests such as Internet access, file access, etc. Access rights may be directly managed by a Registrar, and/or defaults and device specific restrictions may be communicated by the Registrar to an AP, router, gateway, etc. that is positioned to restrict environment access and able to establish access control lists (ACLs), filters, or the like as necessary to restrict access as desired.

Thus, it will be appreciated that after completing registration of a device with the environment, if the guest device wants to access specific resources such as shares or devices for which access was not initially granted, the user or environment administrator can enable such access via the Registrar. For example, as discussed above, a GUI may be used to interactively control initial device access and such a GUI may also be used to change access permissions. In one embodiment, the Registrar is configured to enumerate available resources within the environment, e.g., shares, or input and/or output devices on the network, such as printers, stereo systems, speakers, etc. The user or administrator may select devices and shares a guest device may access. If access is not directly managed by the Registrar, the Registrar communicates access changes to the AP, router, gateway, etc. which is controlling access and it sets up appropriate ACLs, filters, etc. corresponding to the changed access rights.

Note that ACLs may be as simple as IP and/or MAC address and/or port-based filters, or may be more advanced, depending on the capability of the Registrar, AP, router, gateway, etc. limiting access to environment resources. The guest device obtains access only to specified portions of the network, and will be unable to view or access other resources within the user's network. It will be appreciated guest access rights may be configured to automatically expire, e.g., time out, or be revoked on certain conditions, such as when the guest device leaves the environment.

In addition to establishing 406 access rights, it may also be desired to establish 408 communication restrictions. For example, when a device is introduced and its applications and/or functionality registered 402, during the registration process characteristics of the device may be tracked or recorded, such as knowledge that the device is an audio only device such as a telephone, has only a black and white screen, has limited processing power, etc. In the audio only case, for example, communication features discoverable by, or otherwise accessible by, the device may be established in accord with the device's characteristics. For example, if an audio only device seeks to join an audiovisual based conference, the device may be introduced into the conference as an audio only device where all video functionality is automatically disabled, and more particularly, no attempt is made to send video data to the audio only device. Such intelligent data routing may significantly decrease the bandwidth requirements for the audio only device as well as improve bandwidth or other resource performance for other devices having more burdensome requirements.

In addition to establishing 408 communication restrictions, communication aggregation 410 may also be performed. As discussed with respect to FIG. 5 and FIG. 6 below, if multiple devices are engaging in a common task, conventional arrangements typically require each device to individually establish requisite connections while participating in the common task. Common tasks include, for example, streaming audio data, such as music or voice communication, transferring video data such as related to a movie presentation, video conference, video telephone, etc., Voice over IP (VoIP), instant messaging, collaboration applications, and the like. As will be discussed with FIG. 5, significant bandwidth may be wasted in having multiple devices all trying to individually communicate with every other device. Instead of such cross-communication, in various configurations communication aggregation may be performed to simplify communication requirements. In one embodiment, when a common communication nexus such as a gateway, router, firewall, etc. is by several devices to the common task, it may be used to cross-connect devices communicating through it and maintain multiple communication lines on behalf of the devices using the nexus. This thus simplifies the operation of the devices as they need only maintain communication with the nexus, from which the devices will receive the communications from all the other devices. In addition to freeing bandwidth, simplification reduces cost and facilitates home appliance type devices.

Once a device is registered 402, and restrictions 406-410 processed, an association 412 is recorded between a device and its hardware or other software devices that need to know about the introduction of the device, and monitoring 414 is performed for new devices being added to the environment. In the illustrated embodiment, a FIG. 3 Application Framework monitors device introductions. In another embodiment, a FIG. 1 registrar 116 monitors device introductions. As devices are introduced, already registered applications (if any) for the new device are notified when the introduction is complete so that they can engage in data exchanges to provide for automatic configuration of the new device.

In the illustrated embodiment logically processing continues with checking if 416 there was a new device introduction. If 416 a new device is not seen, processing loops back with monitoring 414 for device introductions. The loop 416 back is shown as a dotted line to suggest that processing might not literally loop directly back since a system implementing the illustrated embodiment may perform other tasks and/or processes not illustrated before returning to the monitoring 414. If 416 a new device was introduced, a check 418 is performed to determine if it has associated (registered) apps. If 420 so, those apps are notified 422 to trigger their responsive action to the introduction, e.g., to configure the device or take some other action. If 416 there was no new device, or if 420 there are no associated applications, or after notifying 422 associated applications, processing loops back to monitoring 414 for new devices.

By providing automatic applications triggering on device introduction, this reduces the burden on an end user in having to know what software to run to configure the new device to work in an existing network, what order to attempt to utilize the software, how to effectively limit access to the network for guest devices, etc. Similarly, by providing a way to automatically interrogate introduced devices to identify and handle restrictions 406-410, an end user is able to more simply limit device access to the user's network, and also have opportunity to aggregate devices (if possible) to minimize burden and consumption of the user's resources. Note multiple applications may be registered with a device and that priority and/or execution ordering data may be associated with the applications and/or restrictions to capture dependencies that may exist between the applications, e.g., to allow designating that one application needs to be run before another, or to limit application access in accord with restrictions.

It will be appreciated various features and functions described herein may be provided by way of an API available for use by a Registrar or other device and/or software of a particular environment, such as application software illustrated in FIG. 3 items 316, 318, in an operating system, or by another application to perform the foregoing operations. In one embodiment, an Expert System with appropriate rule sets may be used by the FIG. 3 Application Framework 302 to analyze whether existing device configurations can and/or should be modified in light of new device introduction, such as to take advantage of services now available from the new device. An expert system may also be used to control the execution order of associated applications, if needed, when multiple applications registrations exist for a device.

It will be appreciated device may be introduced in a variety of ways, such as, for example, by activating a wireless transceiver, pressing an "install" button or switch, plugging the device in to a bus communicatively coupled with the Application Framework, etc. When the new device is recognized, e.g., FIG. 4 item 416, an installation "wizard" may become active on a Registrar and/or or on a user interface for the new device. In embodiments utilizing an API implementing functions to perform operations described herein, a callback function could be called to trigger execution 414 of the appropriate application(s). The installation wizard itself would have previously registered 402 itself for all devices. Once the wizard is active, as needed, it may provide instructions and/or configuration questions to a user to assist with installing the new device. While in some cases no intervention by the user is required, thus making matters very simple for a user, in other cases, such as when assigning device restrictions, configuring communication aggregation, or introducing a wireless access point, it may respectively be desirable to prompt a user for access rights, aggregation parameters, a SSID (service set identifier) or other personalization data to associate with the new device, etc.

Figure 5A:
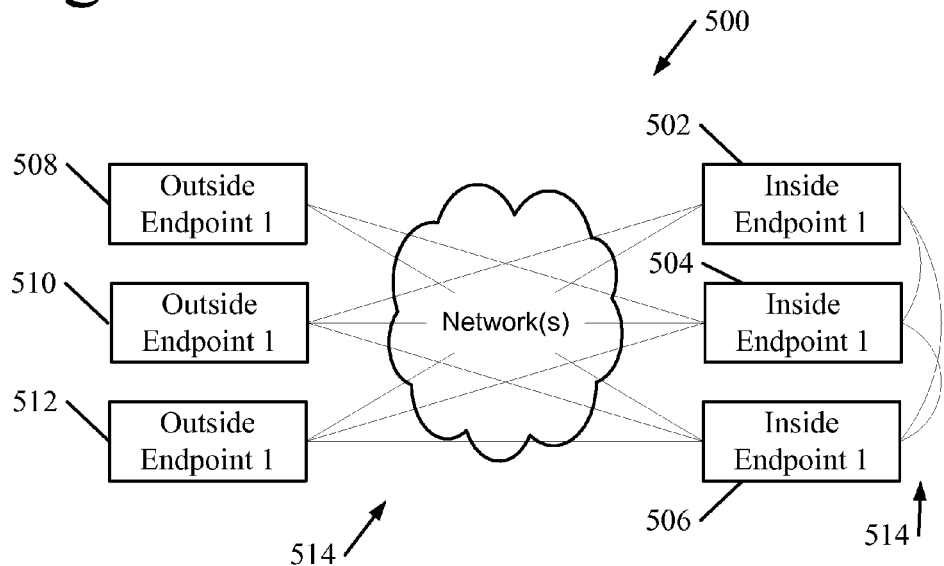
FIG. 5 illustrate two different but common device configurations that may be found in a personal or commercial networked environment such as a Digital Home or Office LAN environment.

FIG. 5 illustrate two different but common device configurations that may be found in a personal or commercial networked environment such as a Digital Home or Office LAN environment. FIG. 5A illustrates a typical peer to peer (P2P) type of conference 500, in which every device 502-506 (e.g., conference endpoints) is required to establish a communication connection with every other device in the conference, such as outside endpoints 508-512. As illustrated, this results in a lot of cross-communication, bandwidth consumption, and communication complexity due to the many crossing communication lines 514 between the devices 502-512.

Figure 5B:
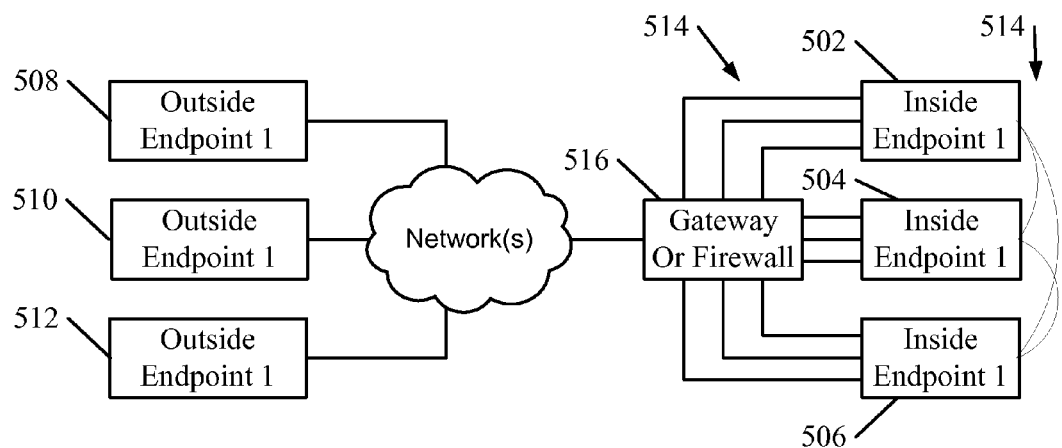
Figure 6:
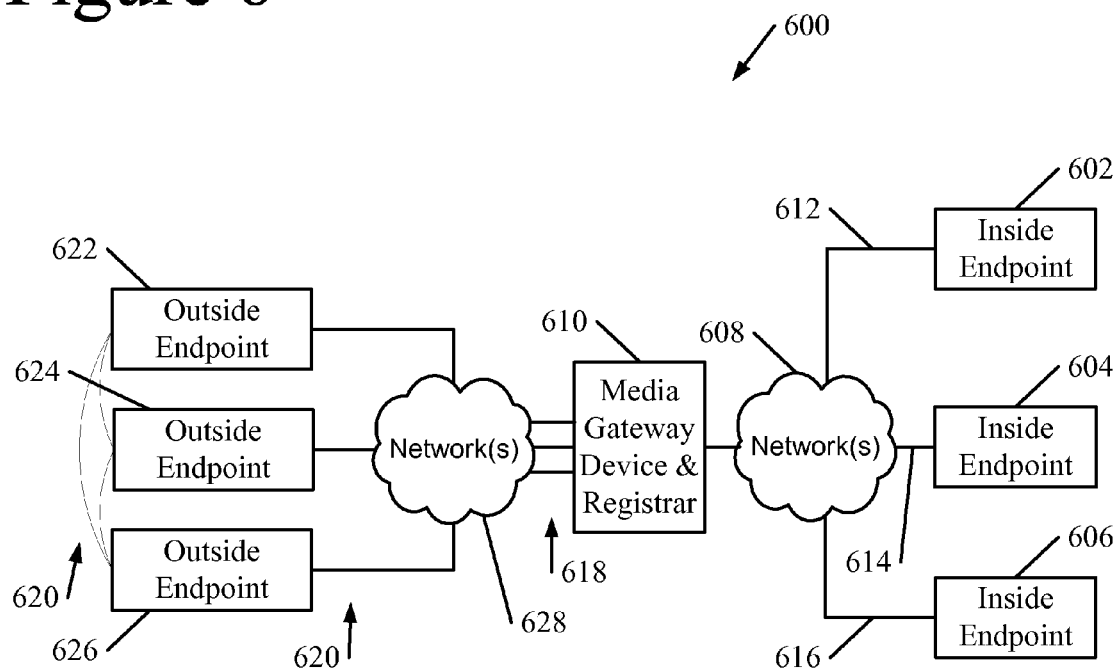
FIG. 6 illustrates a system of devices that may operate in accord with various embodiments of the invention.

Such overhead is especially burdensome in some configurations in which devices participating in a common task, such as a conference, share a common network access, such as a gateway, firewall or other device 516 as illustrated in FIG. 5B. In the FIG. 5B embodiment, all devices 502-512 need to establish a communication connection to every other device, however, since several 502-506 of the devices are behind a common communication nexus 516 such as a gateway, firewall, or the like, this device 516 bears the burden of passing all communication between inner 502-506 and outer 508-512 devices, which also may result in the nexus 516 being a bottleneck. Combining related communication and/or other data transfers may significantly facilitate communication by multiple devices engaging in the common task.

Thus, rather than have multiple devices 502-506 operate independently, instead, in one embodiment, when registering/introducing devices in an environment, e.g., as discussed above with respect to FIG. 4, devices may be evaluated for whether they support functionality that may be aggregated with other devices if such devices are engaged in a common task. For example, as illustrated in the FIG. 6 system 600 of devices, if devices 602-606 all support a particular task, such as conferencing (which includes audio and/or visual conferencing, data conferencing, etc.), the devices are instructed during registration or introduction to use an aggregation communication mode instead of a conventional communication mode. In the illustrated embodiment, the devices are all communicatively coupled by way of a network 608 and communicate through a common communication nexus 610 referred to herein as a such as a Media Gateway Device (MGD). As illustrated the MGD also incorporates the Registrar, e.g., FIG. 1 item 116, to which devices are introduced. As will be appreciated a MGD incorporates data handling capabilities of a gateway, firewall, or the like, along with aggregation features (and Registrar features if present) discussed below.

Thus, in contrast with the FIG. 5 configurations having complex communication lines 514 between devices 502-512, for devices 602-606 sharing a MGD or equivalent devices as a common communication nexus, the devices establish individual communication connections 612-616 with the MGD 610, e.g., over their local wired and/or wireless network 608. The MGD then establishes connections 618 as needed to outside (e.g., with respect to local network(s) 608) end points 622-626. Note only three connections as illustrated are required for all three internal devices 602-606 to communicate with the outside endpoints, and similarly, while the outside devices 622-626 require a conventional burdensome communication lines 620 to communicate with each other, they only need to establish communication with the MGD in order to engage in the common task with the inside end points 602-606. In one embodiment, the outside endpoints are aware of the MGD and hence pursuant to a protocol agreed upon by the endpoints and MGD, each outside endpoint establishes a single communication line 620 to the MGD, e.g., over the Internet or other network 628 communicatively coupling the endpoints 602-606, 622-626 with the understanding the MGD will convey data as needed to the inside endpoints. In another embodiment, each of the illustrated communication lines 620 represents three communication lines from each outside endpoint to each inside endpoint, however, each of these routes to the MGD since it remains the common communication nexus for the inside endpoints.

In one embodiment, based on the characteristics of the devices 502-506, the MGD may attempt to establish a more optimal communication for the device as well as for the communication with outside endpoints 622-626 through the MGD or other gateway, firewall, router, etc. For example, if device 602 is an audio-only telephone, even if the telephone attaches to an audiovisual conference, the MGD can automatically strip out video data from other participants to simplify what data 612 the telephone is required to process. This type of proxying for the telephone also allows the MGD to act as a transcoder to allow incompatible devices to engage in activities not ordinarily supported, such as a video conference on an audio-only device. It will be appreciated that various device characteristics may be determined when registering or introducing a device, such as network interface card (NIC) speed, audio capabilities or associated codecs, video capabilities or associated codecs, screen size, resolution, output abilities, camera specifications, text capabilities, specific application support (Skype™, Instant Messaging, VoIP applications, collaboration applications, etc.), and decisions made regarding aggregation, transcoding, and the like.

Consider a Digital Home scenario in which the MGD 610 is used to set up conference calls with the outside endpoints 622-626 for internal home devices 602-606 that wish to join these calls. In this scenario, the MGD also functions as a home media server, and hence is capable of streaming media to endpoint devices in the home. It will be appreciated that the devices may have wired and/or wireless connections to the MGD. Once devices have been registered and authorized to access resources of the network 608, the MGD reviews the discovered capabilities of the newly introduced device. It will be appreciated the MGD may directly receive these capabilities if it is collocated with a Registrar, or this information is passed to the MGD (e.g., by way of a push or pull mechanism) after successful registration or introduction of a device. The MGD may also be configured to poll for capabilities responsive to monitored execution of certain applications, e.g., in FIG. 3 application layer 302, using a device within the environment, such as communication software executed on an endpoint 602-606.

As discussed above with respect to FIGS. 1-2, during registration with a Registrar, the registrant and Registrar exchange cryptographic data so that devices can establish secure communication sessions, e.g., Transport Layer Security (TLS), Internet Protocol Security (IPSec), etc. sessions between themselves and the MGD. In one embodiment, the MGD sets up a conference call with outside entities, e.g., between outside endpoints 622-626 and inside devices 602-606 in the Digital Home. In the illustrated embodiment there is a single MGD; it will be appreciated there may be multiple MGDs each communicatively coupled so as to tie together multiple sub-networks of devices. Logically, multiple MGDs, if present, may operate as a single MGD. In the illustrated embodiment, each device sets up a session with the MGD, which in turn multiplexes all media streams and sends them to the outside devices participating in the common communication task, e.g., the conference call.

In one embodiment, once the common communication task is established for one of the devices through the MGD, other devices may choose to participate as well through the MGD. When another device enters the call, the MGD uses the device capability information provided and/or discovered when the device joined the network, e.g., during registration or introduction, to mediate the media traffic, determine what data ad/or media streams get sent to particular devices, and transcode or otherwise scale data, such as to reduce high resolution images for small screen sizes, such as for a cell phone or to remove the video entirely, to reduce audio bitrates, etc. A more powerful device such as a desktop or laptop computer engaging in the common communication task will, however, receive complete media streams since such devices are able to support higher capabilities. In one embodiment, the MGD functions as a multiplexer/de-multiplexer for the endpoint communications. In one embodiment, the MGD collates incoming streams from devices 602-606 and sends them out as a single stream to an outside endpoint 622-626. Similarly, in this embodiment, the MGD receives data for the common communication task from each of the outside endpoints and combines them into a single data stream provided to each of the inside endpoints.

In some embodiments, for shared tasks such as the conference example discussed above, it may be important to be able to establish secure connections between participants to prevent eavesdropping on the conference, as well as to enable each party to be confident of the authenticity of other parties in the conference. It will be appreciated such security information can be established during registration or introduction of devices and shared with other conference participants. In particular, in one embodiment, the Registrar (or MGD incorporating the Registrar) receiving device registration acts as a local Certificate Authority (CA) and hence may act as an authority as to the identity of devices within an environment thus allowing devices within the environment to validate the identity of other devices as desired. It will be appreciated conference participants or other endpoints may establish trust relationships with the MGD and indirectly establish trust with other conference participants or endpoints based at least in part on knowledge the other participants or endpoints have similarly established trust relationships with the MGD.

Figure 7:
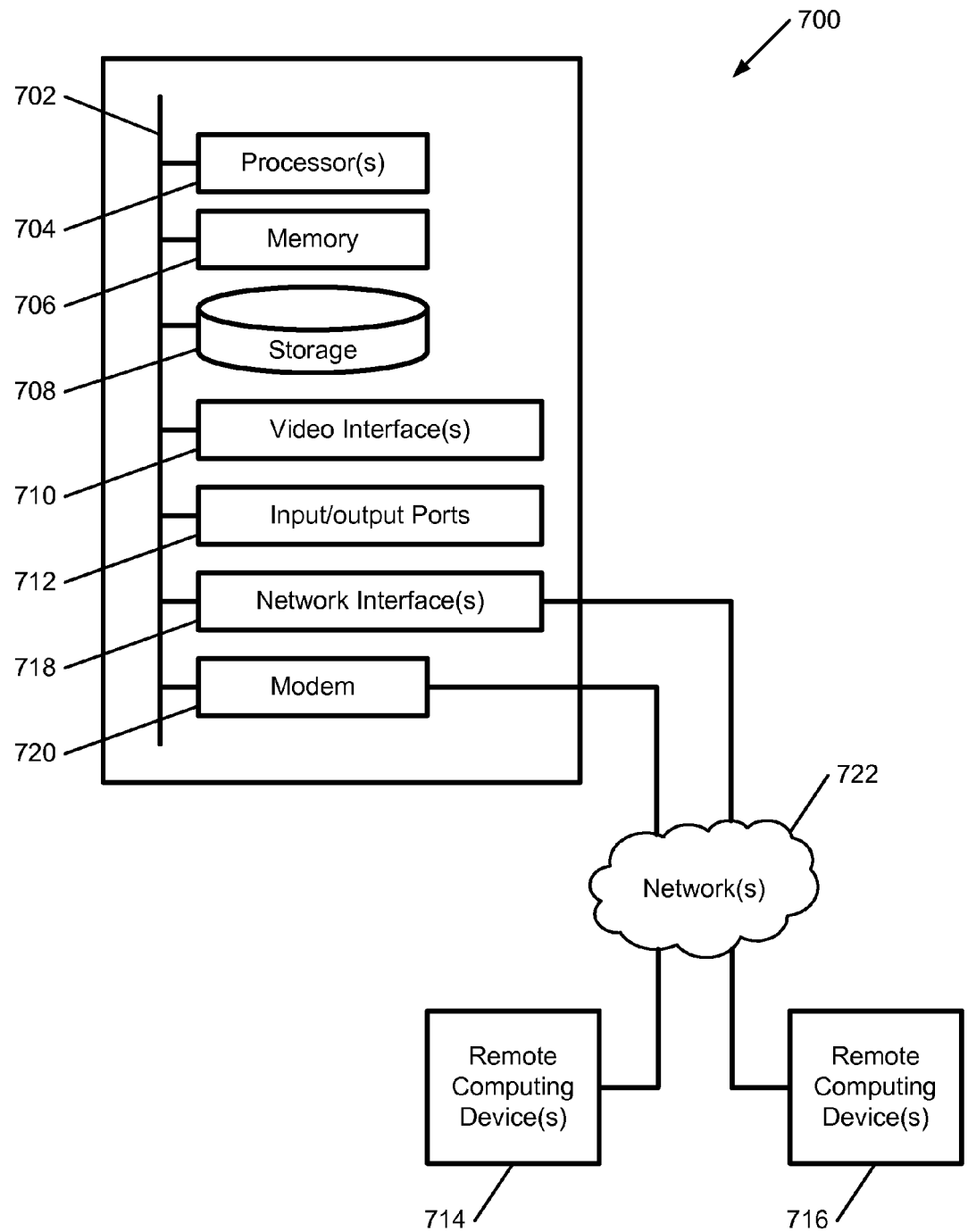
FIG. 7 illustrates a suitable computing environment in which certain aspects of the invention may be implemented.

FIG. 7 and the following discussion are intended to provide a brief, general description of a suitable environment in which certain aspects of the illustrated invention may be implemented. As used herein below, the term "machine" is intended to broadly encompass a single machine, or a system of communicatively coupled machines or devices operating together. Exemplary machines include computing devices such as personal computers, workstations, servers, portable computers, handheld devices, e.g., Personal Digital Assistant (PDA), telephone, tablets, etc., as well as transportation devices, such as private or public transportation, e.g., automobiles, trains, cabs, etc.

Typically, the environment includes a machine 700 that includes a system bus 702 to which is attached processors 704, a memory 706, e.g., random access memory (RAM), read-only memory (ROM), or other state preserving medium, storage devices 708, a video interface 710, and input/output interface ports 712. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 714, 716, such as through a network interface 718, modem 720, or other communicative coupling. Machines may be interconnected by way of a physical and/or logical network 722, such as the network 108 of FIG. 1, an intranet, the Internet, local area networks, and wide area networks. One skilled in the art will appreciated that communication with network 722 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data such as functions, procedures, data structures, application programs, etc. which when accessed by a machine results in the machine performing tasks or defining abstract data types or low-level hardware contexts. Associated data may be stored in, for example, volatile and/or non-volatile memory 706, or in storage devices 708 and/or associated storage media, including conventional hard-drives, floppy-disks, optical storage, tapes, flash memory, memory sticks, digital video disks, etc., as well as more exotic mediums such as machine-accessible biological state preserving storage. Associated data may be delivered over transmission environments, including network 722, in the form of packets, serial data, parallel data, propagated signals, etc., and may be used in a compressed or encrypted format. Associated data may be used in a distributed environment, and stored locally and/or remotely for access by single or multi-processor machines. Associated data may be used by or in conjunction with embedded controllers; hence in the claims that follow, the term "logic" is intended to refer generally to possible combinations of associated data and/or embedded controllers.

Thus, for example, with respect to the illustrated embodiments, assuming machine 700 embodies the FIG. 1 Registrar, then remote machines 714, 716 may respectively be FIG. 1 Client 114 and Station 104. It will be appreciated that remote machines 714, 716 may be configured like machine 700, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A system of devices inside or outside an environment and communicatively coupled therewith, the system comprising:
   at least one outside endpoint outside the environment, each configured to perform a common communication task;
   a plurality of inside endpoints, each configured to perform the common communication task;
   a media gateway device communicatively coupled to the at least one outside endpoint, and the inside endpoints, and configured to aggregate data of the inside endpoints for the common communication task and communicate aggregated data, on behalf of all the inside endpoints, to the at least one outside endpoint; and
   a registrar configured to process an introduction of at least one of the plurality of inside endpoints to the environment, and during said introduction, to determine whether to modify existing configuration or configurations of an inside endpoint or endpoints already present inside the environment based on the inside endpoint to be introduced into the environment,
   wherein the registrar is further configured, during said introduction, to:
       instruct the at least one of the plurality of inside endpoints to use an aggregation communication mode in order to perform the common communication task, the aggregation communication mode facilitating aggregation of functionalities of the plurality of inside endpoints to support the performance of the common communication task;
       determine device characteristics associated with the at least one of the plurality of inside endpoints; and,
       based on the determined device characteristics, exclude from data that is associated with the common communication task and that is to be processed by the at least one of the plurality of inside endpoints a type of data that the inside endpoint does not support.

2. The system of claim 1, wherein the common communication task expects a full complement of communication links communicatively coupling the endpoints, wherein the full complement comprises a communication link communicatively coupling the inside and outside endpoints of each pair of inside and outside endpoints, and
   wherein the media gateway device is configured to facilitate an outside endpoint having fewer communication links than the full complement.

3. The system of claim 2, wherein each inside endpoint has one communication link to the media gateway device, wherein the media gateway device is operable to communicate to each inside endpoint aggregated data from the at least one outside endpoint over the corresponding one communication link.

4. The system of claim 2, wherein each outside endpoint has one communication link to the media gateway device, wherein the media gateway device is operable to communicate to each outside endpoint aggregated data from the inside endpoints over the corresponding one communication link.

5. The system of claim 1, further comprising:
a certificate authority communicatively coupled with the inside endpoints and configured to facilitate trust between at least the inside endpoints.

6. The system of claim 5, wherein the certificate authority is configured to facilitate trust between at least the inside endpoints through facilitation of identity verification of the inside endpoints.

7. The system of claim 5, wherein the registrar is further configured, during said introduction, to identify device functionality of the plurality of inside endpoints to aggregate.

8. The system of claim 7, wherein the certificate authority is disposed within the registrar.

9. A method, comprising:
registering, by a media gateway device, each of a plurality of inside endpoints;
establishing, by the media gateway device, first communication links from the plurality of inside endpoints, including one communication link from each inside endpoint;
establishing, by the media gateway device, second one or more communication links to at least one outside endpoint, including one communication link to each of the at least one outside endpoint;
aggregating, by the media gateway device, data of a common communication task from the inside endpoints through respective communication links from the inside endpoints;
providing, by the media gateway device, aggregated data of the inside endpoints to an outside endpoint through the communication link to the outside endpoint,
wherein said registering includes:
determining whether to modify existing configurations of already registered inside endpoints based on capabilities of an inside endpoint to be registered;
instructing the inside endpoint to use an aggregation communication mode in order to perform the common communication task, the aggregation communication mode facilitating aggregation of functionalities of the plurality of inside endpoints to support the performance of the common communication task;
determining device characteristics associated with the inside endpoint; and,
based on the determined device characteristics, excluding from data that is associated with the common communication task and that is to be processed by the at least one of the plurality of inside endpoints a type of data that the inside endpoint does not support.

10. The method of claim 9, wherein the common communication task is selected from a group of tasks including: audio conferencing, video conferencing, and data conferencing.

11. The method of claim 9, wherein the establishing of the first communication links from the plurality of inside endpoints includes determining characteristics of at least a subset of the plurality of inside endpoints.

12. The method of claim 11, further comprising:
optimizing data streams transmitted through the established communication links from the subset of the plurality of inside endpoints based on the determined characteristics of each inside endpoint in the subset.

13. The method of claim 9, wherein the establishing second communication links to at least one outside endpoint is carried out in accordance with a protocol agreed upon between the at least one outside endpoint and the media gateway device.

14. The method of claim 9, further comprising:
collating, by the media gateway device, first data streams from the inside endpoints; and
sending, by the media gateway device, collated first data streams to the at least one outside endpoint as a single second data stream.

15. The method of claim 9, wherein the inside and outside endpoints are selected from a group including one or more cell phones, one or more desktop computers, one or more laptop computers, and one or more telephone handsets.

16. A non-transitory computer-readable medium having computer-executable instructions stored thereon that, when executed on a computer, cause the computer to perform a method including:
registering each of a plurality of inside endpoints;
establishing first communication links from the plurality of inside endpoints, including one communication link from each inside endpoint;
establishing second one or more communication links to at least one outside endpoint, including one communication link to each of the at least one outside endpoint;
aggregating data of a common communication task from the inside endpoints through respective communication links from the inside endpoints; and
providing aggregated data of the inside endpoints to an outside endpoint through the communication link to the outside endpoint,
wherein said registering includes:
determining whether to modify existing configurations of already registered inside endpoints based on characteristics of an inside endpoint to be registered;
instructing the inside endpoint to use an aggregation communication mode in order to perform the common communication task, the aggregation communication mode facilitating aggregation of functionalities of the plurality of inside endpoints to support the performance of the common communication task;
determining device characteristics associated with the inside endpoint; and,
based on the determined device characteristics, excluding from data that is associated with the common communication task and that is to be processed by the at least one of the plurality of inside endpoints a type of data that the inside endpoint does not support.

17. The non-transitory computer-readable medium of claim 16, wherein the method performed by the computer further includes: determining the characteristics of at least a subset of the plurality of inside endpoints.

18. The non-transitory computer-readable medium of claim 17, wherein the method performed by the computer further includes: optimizing data streams transmitted through the established communication links from the subset of the plurality of inside endpoints based on the determined characteristics of each inside endpoint in the subset.

19. The non-transitory computer-readable medium of claim 16, wherein the method performed by the computer further includes:
collating, by the media gateway device, first data streams from the inside endpoints; and sending, by the media gateway device, collated first data streams to the at least one outside endpoint as a single second data stream.

\* \* \* \* \*